(12) United States Patent
Kong et al.

(10) Patent No.: US 10,812,257 B2
(45) Date of Patent: Oct. 20, 2020

(54) SYSTEMS AND METHODS FOR A CRYPTOGRAPHICALLY GUARANTEED VEHICLE IDENTITY

(71) Applicants: VOLKSWAGEN AG, Wolfsburg (DE); AUDI AG, Ingolstadt (DE); PORSCHE AG, Stuttgart (DE)

(72) Inventors: Liang Kong, Belmont, CA (US); Payton White, Foster City, CA (US)

(73) Assignees: Volkswagen AG, Wolfsburg (DE); Audi AG, Wolfsburg (DE); Porsche AG, Stuttgart (DE)

(*) Notice: Subject to any disclaimer, the term of this patent is extended or adjusted under 35 U.S.C. 154(b) by 116 days.

(21) Appl. No.: 15/811,037

(22) Filed: Nov. 13, 2017

(65) Prior Publication Data

US 2019/0149324 A1    May 16, 2019

(51) Int. Cl.
| | |
|---|---|
| H04L 9/12 | (2006.01) |
| G06F 21/70 | (2013.01) |
| H04L 9/08 | (2006.01) |
| G06F 21/57 | (2013.01) |
| H04L 9/32 | (2006.01) |
| H04W 12/10 | (2009.01) |
| H04W 4/48 | (2018.01) |
| H04L 29/06 | (2006.01) |
| B60R 16/023 | (2006.01) |
| H04L 29/08 | (2006.01) |
| H04L 29/12 | (2006.01) |

(52) U.S. Cl.
CPC ......... *H04L 9/0819* (2013.01); *B60R 16/023* (2013.01); *G06F 21/57* (2013.01); *H04L 9/0891* (2013.01); *H04L 9/3236* (2013.01); *H04L 9/3278* (2013.01); *H04L 63/0876* (2013.01); *H04L 67/12* (2013.01); *H04W 4/48* (2018.02); *H04W 12/10* (2013.01)

(58) Field of Classification Search
None
See application file for complete search history.

(56) References Cited

U.S. PATENT DOCUMENTS

| | | | | |
|---|---|---|---|---|
| 9,269,203 | B2* | 2/2016 | Peirce | H04L 67/125 |
| 9,401,923 | B2* | 7/2016 | Valasek | H04L 63/1441 |
| 9,705,678 | B1* | 7/2017 | Wang | G06F 21/44 |
| 9,916,151 | B2* | 3/2018 | Ye | G06F 8/65 |
| 10,009,325 | B1* | 6/2018 | David | H04L 12/40 |
| 10,129,259 | B2* | 11/2018 | Teshler | H04L 63/10 |

(Continued)

FOREIGN PATENT DOCUMENTS

DE    102008008969 A1    8/2009

OTHER PUBLICATIONS

Security Aware Network Controllers for Next Generation Automotive Embedded Systems. Shreejith et al. ACM. (Year: 2015).*

(Continued)

*Primary Examiner* — Venkat Perungavoor
(74) *Attorney, Agent, or Firm* — Barnes & Thornburg LLP

(57) ABSTRACT

Systems, devices and methodologies for generating a vehicle identification hash value and verifying the integrity of the vehicle. The vehicle identification hash value is generated based on hashes provided by each vehicle component. The generated overall vehicle identification hash value may be dynamic and reflects changes that occur to the vehicle at the component level.

7 Claims, 3 Drawing Sheets

(56) References Cited

U.S. PATENT DOCUMENTS

| | | | |
|---|---|---|---|
| 10,185,682 B2* | 1/2019 | La Marca | G06F 1/3287 |
| 10,243,732 B1* | 3/2019 | Herzerg | G06F 21/45 |
| 10,361,934 B2* | 7/2019 | Elend | H04L 12/40169 |
| 2007/0118752 A1 | 5/2007 | Kiessling et al. | |
| 2007/0287439 A1* | 12/2007 | Weyl | G06F 8/65 |
| | | | 455/420 |
| 2009/0119657 A1* | 5/2009 | Link, II | G06F 8/64 |
| | | | 717/171 |
| 2011/0203003 A1* | 8/2011 | Peeters | G06F 21/52 |
| | | | 726/26 |
| 2011/0213968 A1* | 9/2011 | Zhang | H04W 4/46 |
| | | | 713/158 |
| 2015/0317480 A1* | 11/2015 | Gardner | H04L 9/3221 |
| | | | 726/2 |
| 2016/0099806 A1* | 4/2016 | Racklyeft | H04L 9/0866 |
| | | | 380/281 |
| 2016/0359636 A1* | 12/2016 | Kreft | G06F 21/71 |
| 2017/0093866 A1* | 3/2017 | Ben-Noon | H04L 9/3234 |
| 2018/0004964 A1* | 1/2018 | Litichever | H04L 12/40143 |
| 2019/0087576 A1* | 3/2019 | Olson | G06F 16/9014 |
| 2019/0245872 A1* | 8/2019 | Shin | H04L 12/40 |

OTHER PUBLICATIONS

Hardware Architecture for Trustable Vehicular Electronic Control Units. Adi et al. ACM. (Year: 2009).*

* cited by examiner

SYSTEMS AND METHODS FOR A CRYPTOGRAPHICALLY GUARANTEED VEHICLE IDENTITY

BACKGROUND

The present disclosure relates to systems, devices and methodologies for generating a vehicle identification hash value and verifying the integrity of the vehicle. In particular, the present disclosure relates to systems, devices and methodologies for using a vehicle identification hash value to verify integrity of a vehicle at the component level of a vehicle.

SUMMARY

According to the present disclosure, a vehicle control unit is provided that generates a vehicle identification hash value.

In accordance with an embodiment, the vehicle identification hash value may comprise component hashes for one or more components that make up the vehicle. For example, the component hashes may be actively generated by electronic control units that control various sub-systems of the vehicle. The component hashes may also be representative of non-electronic control units. These non-electronic control unit hashes may be generated passively using PUF. The vehicle control unit may be configured to combine the generated hashes to determine a vehicle identification hash value. If the determined hash value does not match a known predetermined hash value, then the vehicle may be determined to be compromised.

In some embodiments, vehicle components may supply vehicle information, such as sensor information along with their respective hash. The vehicle control unit may discard the vehicle information that is associated with a compromised hash value.

In some embodiments the vehicle control unit may be part of a system, and the vehicle control unit may transmit a verified vehicle identification hash value along with the vehicle information that is determined to be uncompromised. The information may be used by vehicles as part of a fleet, owners of the vehicles, maintenance third parties, and other vehicles on the road that may be part of a communications network.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
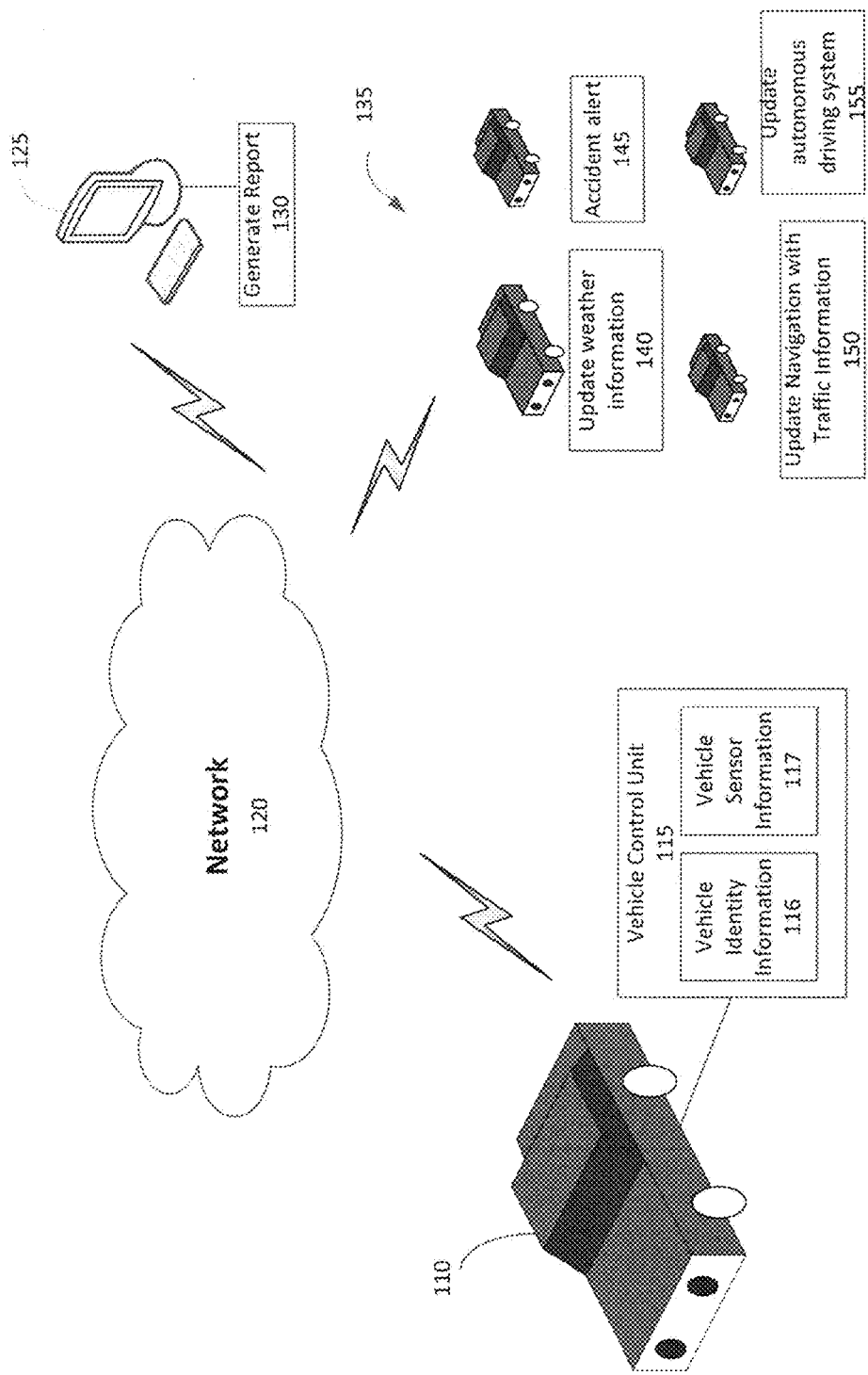
FIG. 1 is a schematic of a system in which a vehicle generates and sends information about its identity and/or associated vehicle information to one or more other vehicles and/or a remote computer.

FIG. 1 constitutes a schematic view of an exemplary vehicle integrity verification and communications system 100. According to FIG. 1, a vehicle 110 may share information via a network 120 with a plurality of receivers 125, 135. The vehicle 110 may have a vehicle control unit 115 that may generate vehicle identity information 116 and, optionally, other vehicle information such as sensor information or status data 117 to be transmitted to other parties.

In some embodiments, the vehicle identity information may include verified vehicle identity information which enables the receivers 125, 135 to be confident that the vehicle and/or the vehicle sensor information has not been compromised. Alternatively, all information 117 and vehicle identity information 116 may be transmitted for remote verification.

Vehicle receivers can include personal computers, mobile devices, or remote server 125, that may generate and display a report 130 containing the vehicle identity and other vehicle information. Vehicle receivers may also or alternatively include a fleet of vehicles 135. Each vehicle of the fleet 135 may use portions of, or communicate requests for particular vehicle information 117 corresponding to the verified vehicle identity (the verified vehicle information) via the network 120 or direct communication with the vehicle 110. At each time the vehicle 110 sends new vehicle information 117, the vehicle 110 may send newly validated vehicle identity information 116. Vehicles in the fleet 135 may use the verified vehicle information to update a plurality of driving assist systems such as navigation, or driver alerts including weather information 140, accident alerts 145, navigation and traffic information 150, and autonomous driving systems 155. The vehicle fleet 135 may also be configured to include vehicle control units like the one disclosed in vehicle 110 in order to share vehicle information in the network.

Figure 2:
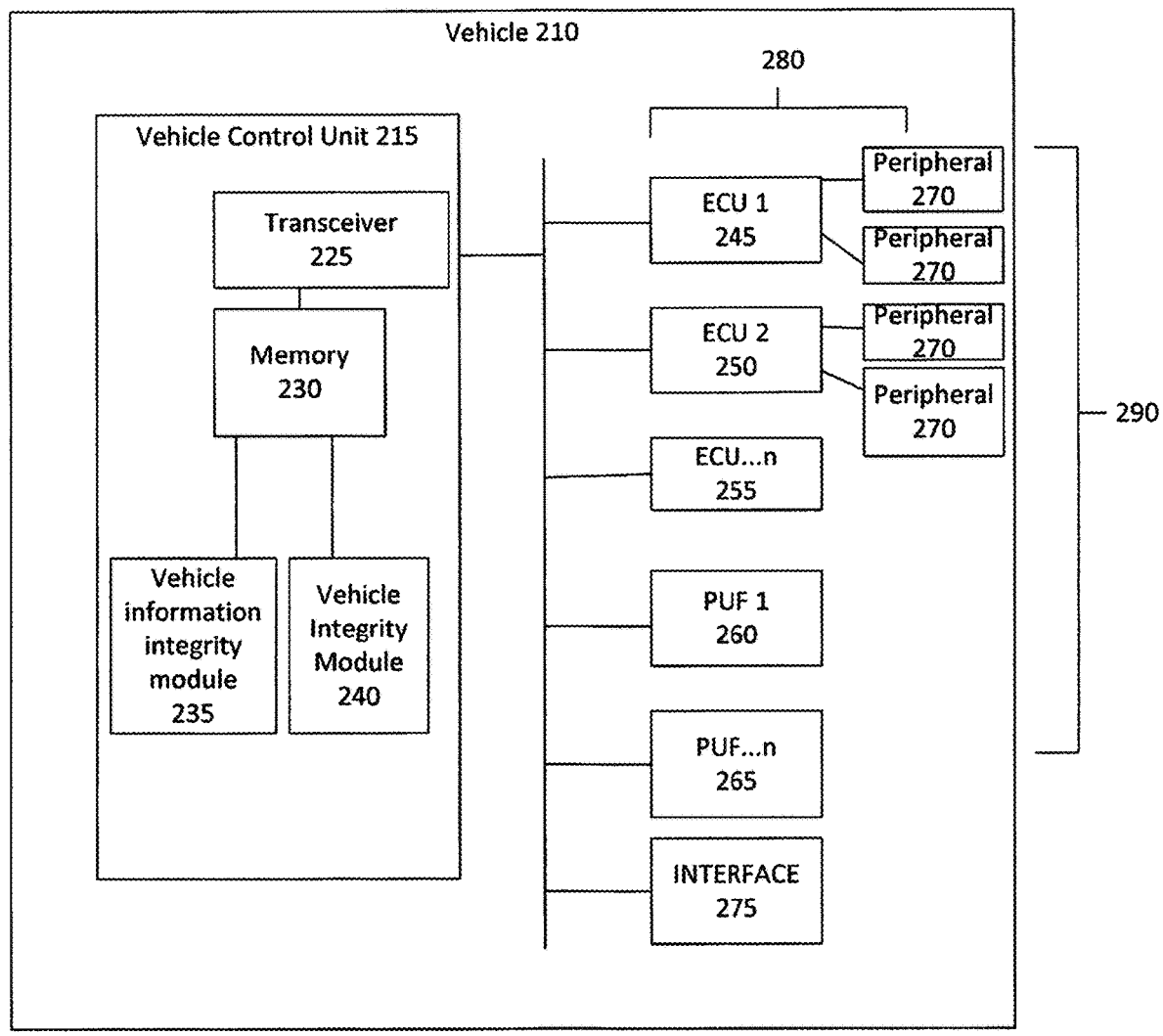
FIG. 2 is a block diagram of the vehicle of FIG. 1 and an on-board communication and processing system as it relates to collecting data from vehicle components and generating and verifying an identification and integrity of the identification of the vehicle.

A vehicle according to the communications system of FIG. 1 is illustrated in FIG. 2. The vehicle 210 may include a communications bus 220 or other known vehicle communications system along which a vehicle control unit 215 communicates with various electronic control units (ECU's) 245, 250, 255 and non-electronic control units (NON-ECU's) 260, 265. The NON-ECU components may be "PUF" devices or physical unclonable function devices. The vehicle control unit 215 may include a vehicle information integrity module 235 and a vehicle integrity module 240. The modules 235,245 may be in communication with a local memory 230 as well as a transceiver 225.

One or more ECUs may be in communication with the vehicle control unit 215. Each ECU 245, 250, 255 may have at least a processor 246, 251, 256 that may actively generate a hash, or digital fingerprint that identifies the ECU. Each ECU 245, 250, 255, may optionally include a plurality of peripheral devices 270, such as sensors and actuators, communicatively coupled to the ECU as part of a vehicle sub-system 280. In some embodiments, the ECU 245, 250, 255 may generate hashes that incorporate information from hashes that identify the peripheral devices 270. In some embodiments, the peripheral devices 270 may not be included in the hash generated by the ECU 245, 250, 255. Exemplary ECUs that may be in the vehicle 210 include a door control unit (DCU), engine control unit (ECU), electric power steering control unit (PSCU), human machine interface (HMI), powertrain control module (PCM), seat control unit (SCU), telematics control unit (TCU), transmission control unit (TCU), brake control module (BCM, ABS, ESC), and a battery management system. The ECUs 245, 250, 255 may be configured to self-report their generated hash along with operational or sensed information within their sub-system 280 to the vehicle control unit 215.

One or more PUF components may also be passively in communication with the vehicle control unit 215. PUF components include any vehicle components that do not have a microprocessor and cannot actively generate a hash (digital fingerprint). PUF components have some physical microstructure structure that reacts with a stimulus challenge in an unpredictable but repeatable way, which may be the hash. Examples of PUF components can be stand-alone sensors and actuators such as cameras, LiDAR, vehicle pumps, solenoids, or any other silicon-based vehicle components. These PUF components 260, 265 may passively generate a hash based on stimulus or query generated and sent by the vehicle control unit 215 as will be explained in further detail in FIG. 3. PUF components 260, 265 may further send information such as sensed data or operational information to the vehicle control unit 215 with the returned stimulus signal.

The vehicle control unit 215 may receive the actively generated and passively generated hashes and process them in a vehicle integrity module 240 to create an overall vehicle hash. The vehicle integrity module 240 may compare the created overall vehicle hash with a stored predetermined vehicle hash, which may be stored in memory 230. The outcome of this comparison may be communicated via the bus 220 to a user interface 275 having a display or other audible alerting mechanism.

In some embodiments, the user interface 275 may also be a hash reporting ECU component in the vehicle. The outcome of the comparison may also be communicated via the transceiver 225 to a remote network or device as described in FIG. 1.

Vehicle control unit 215 may also include a vehicle information integrity module 235. Vehicle information integrity module 235 may process the additional operational or sensed information received from the components 290 to determine the integrity of the information. The outcome of this processing may be communicated via the bus 220 to a user interface 270 having a display or other alerting mechanism. The outcome of the comparison may also be communicated via the transceiver 225 to a remote network or device as described in FIG. 1.

Figure 3:
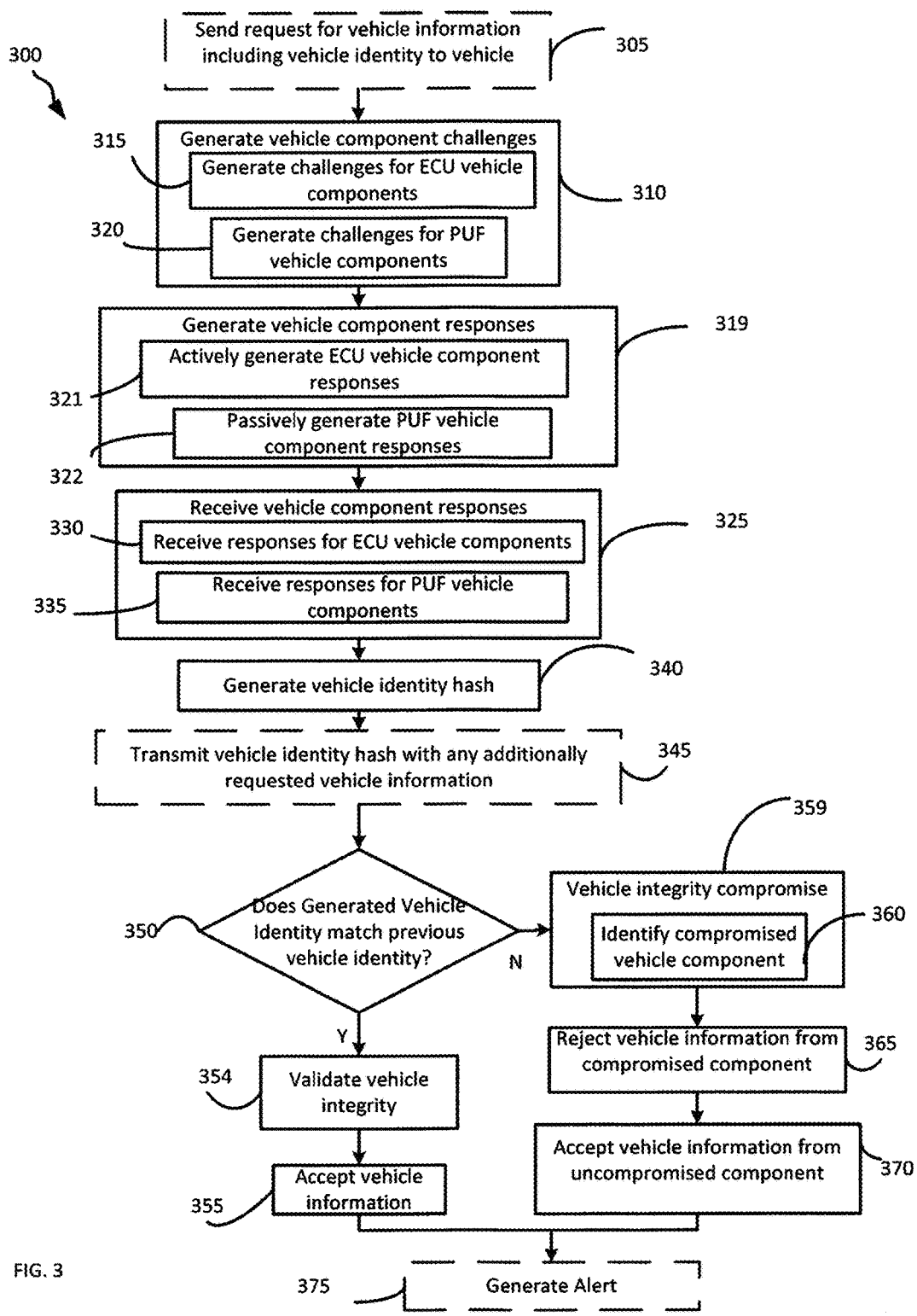
FIG. 3 is a method for cryptographically verifying the integrity of a vehicle and information associated with the vehicle.

An example of a method of cryptographically guaranteeing the integrity of a vehicle and information provided by the vehicle in accordance with the disclosed embodiments is illustrated in FIG. 3. Such a methodology may be performed under the control of a vehicle control unit.

As shown in that figure, control begins at 305 wherein a request may be sent for vehicle information including at least the vehicle identity. This request may be a remote request from an outside source or third party. Alternatively, the method may be programmed to periodically report particular identity or other sensed information based on time or another trigger. For example, a vehicle that is part of a car-sharing fleet may be triggered in response to a new user entering one of the vehicles.

A vehicle controller, such as the vehicle control unit, may then generate vehicle component challenges 310, to which each vehicle component generates a respective response 319. These challenges may include challenges for ECU vehicle components 315 and challenges for PUF components. The challenges for ECU components may include queries for ECU information as well as for the ECU to generate a hash. The ECU components may include peripherals as discussed above in FIG. 2. Each peripheral may also include a digital fingerprint, or hash, which the ECU processes to form an overall response including at least a cryptographic hash value for the ECU to submit to the controller 321. In some instances, the peripherals may be PUF components, in which case the ECU may send a challenge signal or stimulus and receive reacted signal. This process is further detailed below with respect to the stand-alone PUF components that are in direct communication with the vehicle bus.

The challenges for the PUF components 320 may comprise one or more stimuli or signals that react with the device in a particular known manner and may also include requests for sensor data, or other information. In some embodiments, the challenge may be an electronic challenge in which the signal is communicated to the PUF component and the response, or reaction is determined based on the electronic properties an integrated circuit of the PUF component such as delay of gate, or threshold voltage of the PUF component. This passive reaction may generate the hash of the PUF component 322 However, optical, magnetic, and radiofrequency, acoustical, and other challenges may be sent and reactions received from physical PUF components such as vehicle body panels, alignment components, battery and engine block components.

The controller may receive the vehicle component response 325, which may include the actively generated hash values and vehicle information from ECU components 330 as well as the passively reacted hash value and vehicle information from PUF components 335. All of the hashes may be combined to generate a vehicle identity hash value 340. This generated vehicle identity hash value may be transmitted optionally 345 or remain on-board for verification. The generated vehicle identity hash value is compared with a predetermined known vehicle identity hash value 350. If the hashes match, then the generated vehicle identity is validated 354 and the vehicle integrity is uncompromised at this point in time. All vehicle information that was transferred with the hashes may be accepted as uncompromised vehicle information and further stored and/or sent to remote locations 355 and or otherwise communicated as an alert 375.

If the generated identity hash does not match the predetermined vehicle identity hash, then the vehicle integrity may be determined to be compromised 359. Examples of how a vehicle integrity may be compromised that will affect the vehicle identity hash include hacking, damaging, substituting or tampering with one or more vehicle components. The process may further include identifying the particular compromised vehicle component or components 360. As discussed above, the component hash values or "fingerprints" are designed so that any alterations to the components or wholesale removal and replacement may alter the component hash and correspondingly alter the overall vehicle identity hash. In this manner, the determined vehicle identity hash value may be dynamic and change as the components change. As the ECUs may include PUF components, the controller may query the ECU to identify which PUF component is compromised, in order to determine where in the sub-system the compromise is located.

Upon determination of the compromised vehicle component, the controller may reject the vehicle information that was received from that vehicle component 365, and any other information that may not be valid in view of the compromise. For example, if an ECU is determined to be compromised, all information downstream the ECU in the peripherals of the sub-system may be discarded as compromised. Vehicle information associated with uncompromised vehicle components may be accepted 370. Optionally, the control may generate and transmit an alert 375 such as a visual display or report that includes compromised and/or uncompromised components and uncompromised vehicle information.

This method may be integrated in a variety of systems including connected cars, car sharing, rental car services, maintenance and factory services. For example, vehicles that share real-time traffic information collected via a radar sensor can be made aware of receipt of compromised information or even block receipt of compromised information so that only accurate traffic information is received. Moreover, shared autonomous driving situations and vehicle reactions can be shared as part of machine learning models and neural networks. By verifying authenticity, corrupted or bogus data information collected at one vehicle is prevented from compromising automated driving systems and driving models used in other vehicles. Car sharing vehicles may generate a report of all vehicle components and their status such as faulty brakes, or other vehicle issues that may not be outwardly visible to a new user of a vehicle and alert a user via either the vehicle interface display or via an output to the corresponding mobile app when the use of the vehicle starts. Moreover, car sharing vehicles or other vehicle fleets may periodically report back vehicle component information so that companies can make decisions regarding vehicle maintenance and be alerted to vehicle component theft, tampering, or damage. In a standard rental car transaction, although the vehicle is returned and gone over, a report can be generated by the car that can be compared to the report generated before the car left the lot in order to determine any unseen changes that have taken place to the vehicle while it was rented. Further, the reports can be generated for maintenance centers and manufacturing centers to assist in pinpointing root causes of vehicle problems and aftermarket vehicle components. In view of this component level hash value identification, any authorized replacement or modification of vehicle components may include authorized updating of the stored known vehicle identification hash.

As cars become "connected" there is a greater concern about the authenticity of information exchanged between cars and their connection infrastructures. Public Key Infrastructure (PKI) has been widely used in a vast array of device authentications including PCs, smart, devices and IoTs. However, use of PKI is insufficient in verifying vehicle identity, especially in a connected infrastructure as vehicles are not static, inseparable objects. Instead they are made of a plurality of vehicle components that may, frequently over the lifespan of the vehicle, be repaired, removed, replaced, or otherwise altered. PKI merely verifies at the highest level, that the vehicle is still the vehicle. Verification of PKI cannot ensure the integrity of the vehicle components that make up the vehicle, or information associated with those components. There is a need to identify the vehicle that reflects changes in the components that make up the vehicle. In this manner, validation of the vehicle identity ensures the integrity of all of the components that make up the vehicle as well as information generated by any of the components that make up the vehicle. By generating hashes for each vehicle component a cryptology tree, similar to a Merkle Tree, may be used to verify vehicle integrity. Although exemplary embodiments are discussed in the context of a vehicle, planes, trains, motorcycles, and other transportation devices may also employ the disclosed integrity verification.

Exemplary embodiments have been discussed in detail herein. While specific exemplary embodiments have been discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatus/systems for performing the operations disclosed herein. An apparatus/system may be specially constructed for the desired purposes, or it may comprise a general purpose apparatus/system selectively activated or reconfigured by a program stored in the apparatus/system.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM), random access memory (RAM), magnetic disk storage media, optical storage media, flash memory devices including thumb drives and solid state drives, and others.

In the following description and claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" or "controller" may comprise one or more processors.

Further, the term computer readable medium is meant to refer to any machine-readable medium (automated data medium) capable of storing data in a format readable by a mechanical device. Examples of computer-readable media include magnetic media such as magnetic disks, cards, tapes, and drums, punched cards and paper tapes, optical disks, barcodes and magnetic ink characters. Further, computer readable and/or writable media may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc.).

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. A vehicle information communication system comprising:
    one or more vehicle components configured to collect and communicate information about the vehicle,
    a vehicle control unit configured to receive the information about the vehicle, each information including a corresponding hash value, and generate a vehicle identity hash value based on the communicated corresponding hash values of each vehicle component, and
    means for determining the integrity of the vehicle information by comparing the generated vehicle identity hash value with a known predetermined vehicle identity hash value so that in response to a match between the generated vehicle identity hash value and a known predetermined vehicle identity hash value, the vehicle information is determined to be uncompromised,
    wherein the means comprises a vehicle information integrity module, the module further configured to determine that some or all of the vehicle information is compromised in response to a discrepancy between the generated vehicle identity hash value and a known predetermined vehicle identity hash value, and
    wherein the vehicle information integrity module is further configured to determine which of the information has been compromised by determining which component hash value is changed and which information is associated with the changed hash value and to discard the compromised information.

2. The vehicle information communication system of claim 1, wherein the information comprises sensor information and the vehicle components include one or more electronic control units and a non electronic control unit component.

3. The vehicle information communication system of claim 2, wherein the generated vehicle identity hash value is based on hash values generated by electronic control units and a hash value extracted by physical unclonable function based on the non electronic control unit component.

4. A method for cryptographically indicating the identity of a vehicle comprising:
    generating and transmitting a hash value for an electronic control unit component installed in the vehicle;
    generating and transmitting a hash value for a non electronic unit component installed in the vehicle; and
    determining a vehicle identity hash for the vehicle via a vehicle identity module based on the generated hash values and comparing it to a known vehicle identity hash for the vehicle, and
    transmitting the vehicle identity hash and the information collected from each electronic control unit and non electronic unit to a remote location,
    determining the vehicle is uncompromised in response to the determined vehicle identity hash matching the known vehicle identity hash, and
    wherein the control unit further determines which component is compromised based on the determined vehicle identity and discards the corresponding sensor information transmitted by compromised vehicle component.

5. The method of claim 4, wherein the remote location is one of a vehicle fleet, a mobile device, and a maintenance center, and the uncompromised determination is performed at the remote location.

6. The method of claim 4, wherein the uncompromised determination is performed by a control unit in the vehicle and the information collected from the electronic control unit and the non electronic control unit components are transmitted in response to the determination the vehicle is uncompromised.

7. The method of claim 4, wherein the non electronic control unit component is a vehicle sensor and the physical unclonable function is an electronic PUF, and wherein the hash value for the non electronic control unit component is generated by a vehicle control unit using a physical unclonable function.

* * * * *